UNITED STATES PATENT OFFICE.

E. C. HASERICK, OF LAKE VILLAGE, NEW HAMPSHIRE.

IMPROVED MODE OF MELTING AND AGGREGATING IRON CHIPS, TURNINGS, &c.

Specification forming part of Letters Patent No. 53,142, dated March 13, 1866; Reissue No. 2,250, dated May 22, 1866.

*To all whom it may concern:*

Be it known that I, E. C. HASERICK, of Lake Village, in the county of Belknap and State of New Hampshire, have invented a new and useful Improvement in Melting and Aggregating Iron Chips, Turnings, &c.; and I do hereby declare that the following is a full, clear, and exact description thereof, which will enable others skilled in the art to fully understand and make use of the same.

This invention consists in a new and useful process of treating and melting iron chips, turnings, &c., such, for instance, as accumulate under the planing-machines or turning-lathes in machine-shops, and which, unless melted together and aggregated, are treated as waste and are considered useless. Attempts have been made to aggregate them by placing them within pots or castings before they are put in the blast, so as to keep the oxygen from burning them and blowing them out of the cupola; but such attempts have not been economical and profitable.

My improved method and process is as follows: I take fine chips, turnings, and shavings of iron, which, if placed directly in a furnace, would be liable to be burned in contact with the oxygen of the blast and to be blown out of the cupola by the blast, and protect them by water mixed with earth, clay, or any other suitable material, to which may be added a little sulphuric acid—enough to create alum—or with water alone, or any other substance capable of protecting the iron chips, &c., against coming in immediate contact with the oxygen of the blast. In this condition the smallest chips of iron can be aggregated and melted without danger of burning them or of having them blown away by the blast.

In carrying out my invention I take a suitable quanty of iron chips, turnings, or shavings from repair and machine shops; then I make a mixture of clay and water of about the consistency of milk, and pour it over the iron, mixing and stirring the mass until the iron is well covered with the liquid. It is then ready to be put into the fire, when the iron will be quickly melted without injury to its quality and without much loss of its quantity. Any sort of earth can be used instead of clay, and I have used water mixed with earth and ashes or plain water with perfect success. One of my experiments with one thousand pounds of chips resulted as follows:

| | | |
|---|---|---|
| Pure iron for castings.... | 830 | pounds. |
| Cinders ..... | 155 | " |
| Loss ..... ..... | 55 | " |
| Total..... | 1,000 | pounds. |

The chips may be mixed with the solution or liquid immediately before using them, or days before. When the mixture is dry more clay and earth may be added to protect the iron, and the addition of a little sulphuric acid will be advantageous.

What I claim as new, and desire to secure by Letters Patent, is—

The within-described process of protecting iron chips, shavings, turnings, or other fine particles of iron, and preventing them from being burned and blown away by mixing them with water, or a solution of clay or earth or other material in water, or with any liquid capable of producing the same result.

The above specification of my invention signed by me this 6th day of April, 1866.

E. C. HASERICK.

Witnesses:

WM. F. MCNAMARA,
W. HAUFF.